United States Patent
Rimpeläet al.

(10) Patent No.: US 6,697,604 B1
(45) Date of Patent: Feb. 24, 2004

(54) METHOD FOR TESTING THE FUNCTIONING OF A RADIO APPARATUS, AND A MOBILE STATION

(75) Inventors: Riku Rimpelä, Tampere (FI); Timo Narvinen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/506,993

(22) Filed: Feb. 18, 2000

(30) Foreign Application Priority Data

Feb. 23, 1999 (FI) .................................................. 990390

(51) Int. Cl.[7] .......................... H04B 17/00; H04Q 7/20
(52) U.S. Cl. ............................. 455/67.14; 455/67.11; 455/67.13; 455/67.16; 455/67.7; 455/423; 455/424; 455/425
(58) Field of Search ....................... 455/67.1, 67.3, 455/67.4, 67.7, 68, 69, 70, 72, 423, 724, 425; 370/252

(56) References Cited

U.S. PATENT DOCUMENTS

| | | | | |
|---|---|---|---|---|
| 4,247,934 A | * | 1/1981 | Parras | 370/15 |
| 4,264,959 A | * | 4/1981 | Blaass | 364/487 |
| 5,381,444 A | | 1/1995 | Tajima | 375/1 |
| 5,982,760 A | * | 11/1999 | Chen | 370/335 |
| 6,434,364 B1 | * | 8/2002 | O'Rriordain | 455/67.1 |
| 6,445,916 B1 | * | 9/2002 | Rahman | 455/423 |
| 6,466,767 B1 | * | 10/2002 | Lidbrink et al. | 455/67.1 |

FOREIGN PATENT DOCUMENTS

| | | |
|---|---|---|
| EP | 0535838 A2 | 4/1993 |
| EP | 0734192 A2 | 9/1996 |
| WO | WO 99/63764 | 12/1999 |

* cited by examiner

*Primary Examiner*—William Trost
*Assistant Examiner*—Meless Zewdu
(74) *Attorney, Agent, or Firm*—Perman & Green, LLP

(57) ABSTRACT

A method for testing the function of a mobile station includes starting the generation and transmission of uplink data to a testing apparatus in response to a downlink message of a certain protocol layer received from the testing apparatus. The transmission is controlled by a test procedure determined for the protocol layer in the mobile station, where the test procedure is activated by the message. The mobile station is intended to operate in a packet switched communication network based on a cellular network where the mobile station includes means for receiving downlink data from the testing apparatus, means for transmitting uplink data to the testing apparatus, and protocol means for generating and processing data.

13 Claims, 4 Drawing Sheets

METHOD FOR TESTING THE FUNCTIONING OF A RADIO APPARATUS, AND A MOBILE STATION

BACKGROUND OF THE INVENTION

1. Field of the Invention

The present invention is directed to testing, and in particular to testing the function of a mobile station.

2. Brief Description of Related Developments

Up to the digital, cellular systems of the second generation, radio apparatuses, such as mobile stations, have been primarily phones, wherein the information to be transmitted has been primarily digitized speech. For speech transmission in communication between a mobile station and a base transceiver station, a so-called traffic channel has been defined, whose properties are optimized according to features characteristic to speech communication. However, the use of mobile stations is becoming more versatile with expansions in the systems of the second generation and particularly with the introduction of digital cellular radio systems of the third generation. Good examples of expansions of the second generation designed for the GSM system (Global System for Mobile Telecommunications) are HSCSD (High Speed Circuit Switched Data), in which one connection between a terminal device and a base station is allocated several time slots of the TDMA frame; the GPRS (General Packet Radio System) which is based on packet-switched connections between the base station and the terminal device instead of previous circuit-switched connections; as well as the EDGE (Enhanced Data rates for GSM Evolution), in which modulation methods and channel coding are changed to achieve a considerably higher momentary data transmission rate between the base station and the terminal device than in devices of prior art. The GSM system refers generally to its different versions at operational frequencies of 900 Mhz, 1800 Mhz and 1900 Mhz, although the latter ones have also been called DCS1800 and DCS1900 (Digital Communications System at 1800/1900 Mhz).

In more versatile mobile communication, the transmission of data other than digitized speech will be of increasing importance. Data transmission is thus characterized by the non-real-time quality in general, as well as by entirely different demands on error correction and variations in the data transmission rate than in digitized speech. Data transmission comes into question particularly when the terminal device in the cellular radio system is a mobile phone which is connected to a separate data processing auxiliary device, such as a computer. For data transmission, mobile communication systems are provided with specified traffic channels whose properties can be optimized for data transmission.

Testing of terminal devices for the functions involved in e.g. the use of traffic channels has proved problematic. The use of traffic channels is conventionally involved in a situation shown in FIG. 1, in which a mobile phone MS (mobile station) used as the terminal device is locally connected with DTE (data terminal equipment) of a terminal adapter TA. The cellular radio system is simulated during the test by a system called SS (simulation system). The testing of traffic channels has required that a functioning data transmission connection is set up between the SS and the DTE via the MS, to serve a simultaneously functioning application requiring data transmission. The application in question must be active in the DTE and it must be simulated in the SS, which causes extra complication in the test. This may also extend the time duration of the test.

The need of a separate data terminal and the application to be run therein, as well as the very long extended testing time have easily the result that the data terminal interrupts the data transmission connection set up for the test, because one of the time limits specific for the application in question expires or the number of errors detected in the data transmission channel exceeds a limit value specific for the application in question. This causes uncertainty and a need to test the status of the device, particularly the data transmission protocol, during the test. Furthermore, known tests usually apply the procedure that a frame received by the data terminal from the SS (downlink, i.e. data transmission from the base station to the mobile station), is circulated bit by bit as such uplink (i.e. data transmission from the mobile station to the base station), and downlink data transmission is circulated back to the SS, which usually confuses the numbering of uplink frames specific for traffic channels, and also causes the data terminal to interupt the data transmission connection. Moreover, problems are caused by the fact that data transmitted on traffic channels may consist of such upper level units which in the radio connection between the base station and the mobile phone must be divided into several bursts in succession or close to each other. Information is transmitted in the channel in radio frequency bursts with limited duration, consisting of a sequence of modulated bits. So that the data terminal could be confirmed of the error-free reception of the information thus transmitted, it must decode a large number of frames and recombine the information contained therein. As a result of all this, testing of the functioning of a traffic channel by a conventional method involves largely the testing of the functioning of the terminal adapter and data terminal connected with the mobile phone and not the functioning of the mobile phone itself. This is inappropriate particularly for tests related to the type approval (TA) of mobile phones.

Attempts have been made to approach the problem related to cutting off of a connection from the point of view of the functioning of the data terminal, i.e. it has been allocated a testing mode, in which normal reactions to the long connection time and the confusion of numbering of the frames are eliminated. However, this does not eliminate the problem that the final result of the test intended for testing the mobile phone depends largely on whether the data terminal and the software controlling its operation function correctly, or partly on whether the upper levels of the data transfer protocol or external connections (e.g. external data interface) of the mobile phone function correctly.

There are known methods in which the necessary functions are defined, whereby downlink data related to the traffic channels to be tested is circulated back uplink in the mobile station so that it is not passed via the external terminal device. It is characteristic for the test loops of the methods that the response generated in the mobile station to a command of a determined protocol level received from the testing apparatus is to generate a traffic channel test loop to circulate downlink data received from the testing apparatus back uplink to the testing apparatus, and the reception of downlink data and the transmission of uplink data is controlled by said protocol level during the testing.

In the methods, the communication protocol controlling the test situation has been modified in a way that for the test mode, only a required connection of a lower protocol level is opened between the mobile station to be tested and the testing apparatus simulating the cellular radio system. The mobile station does not need to be connected with any external data terminal device at all, nor does an actual data call need to be set up in view of the upper protocol layers being aware of the connection set up. The fact that the upper protocol layers are unaware prevents an untimely termination of the connection by a function involved with them. The test data is conveyed downlink from the testing apparatus to the mobile station which circulates applicable parts of the test data back downlink. The test loop is a logical connection to a certain point in a chain of components and functions intended for downlink data processing.

For testing different functions of a mobile station, the method is modified in several embodiments which differ from each other in the "depth" in which the circulation of the test data of the mobile station takes place uplink. The depth refers to the number of components and/or functions through which the downlink test data proceeds in the mobile station before its circulation back uplink. Preferred embodiments include e.g. the circulation of the test data to encryption, modulation and transmission, as well as after reception, demodulation, decryption, and channel decoding to channel coding, encryption, modulation, and transmission.

Primarily for the GSM system but also for the GPRS system, advantageous embodiments have been defined for circulating test data by means of a test loop in the GSM specification 04.14 Version 5.1.0 (1998–10), which is hereby referred to as prior art. Each test loop is activated in the mobile station by sending the mobile station a command to turn on the test loop. In principle, the information bits contained in each burst received by the mobile station on a downlink traffic channel are circulated back to a certain downlink burst. In the GSM system, each burst contains 114 data bits to be circulated, when so-called stealing flag bits are excluded. In the first defined method, the mobile station circulates the data received in a certain downlink time slot to a time slot of an uplink channel, which in the GPRS is the uplink PACCH time slot. In another mechanism, the mobile station circulates the content of as many received downlink time slots as possible uplink according to certain rules in the GPRS system.

According to the description above, the physical layer (Layer 1) of a circuit-switched GSM system has been tested by forming a data transmission connection. Testing has also been possible by forming the test loop in the physical layer, wherein the mobile station reports the received data to the testing apparatus and it has thus been possible to measure e.g. the sensitivity of the mobile station.

With a mobile station according to the GPRS system, however, it is very difficult or even impossible to perform testing of the physical layer in detail, or merely testing of functions in the physical layer of the GPRS system in the manner described above. According to the character of packet-switched GPRS, data transmission, particularly the formation of physical radio waves itself, is activated only when there is some data to be transmitted in the mobile station. The testing method mentioned in the GSM specification differs thus considerably from the normal operation of the GPRS system. By means of test loops, also the dynamic and independent testing of functions of downlink or uplink data transmission is impossible. Tests of prior art are only applicable for the testing of basic functions in the physical layer, i.e. for testing of the sensitivity of the mobile station. It is typical for type approval tests that certain minimum sensitivity is required of the mobile station at low signal levels, which means that the bit error rate (BER) at a certain signal level must not exceed a determined limit value.

In the GSM system, data transmission between communication devices, such as a mobile station and a base station, takes place on one logical radio channel. The packet switched GPRS system (General Packet Radio Service) boosts data transmission, because the same logical radio channel can be used by several different mobile subscribers. Data transmission between the mobile station and the base station takes place only when needed, and the logical radio channel is not reserved for communication between only one mobile station and base station.

The GPRS system typically contains different MAC modes in uplink resource allocation, of which the use of USF (Uplink State Flag) values in received downlink data blocks (dynamic allocation) can be mentioned. In uplink data transmission, the USF value is used to refer to those uplink time slots, in which the mobile station transmits information. The USF value is transmitted continuously in connection with downlink data transmission. Upon measuring the USF sensitivity, the mobile station needs said USF value as well as the capability to report the received USF value to the test apparatus. In addition to the USF, also other variables are known which cannot be measured by known test loops.

Furthermore, test loops of prior art cannot be used to test the operation of a mobile station in different MAC modes, which include the so-called dynamic allocation mode, the extended dynamic allocation mode, and the fixed allocation mode. In the GPRS system, there is considerably more signalling in the physical layer which did not need to be tested before, such as resource requests preceding the transmission of data blocks.

With reference to FIG. 3 and in a normal situation, data originates from an application of the uppermost layer in the communication protocol (application layer 306), and data transmission (reference 308) is not possible so that the function of the lowest layer, i.e. the physical layer, were predictable. For example, it is very difficult to achieve uninterrupted, continuous data transmission. Furthermore, the control of the precise timing of the RLC/MAC functions is thus not possible, although it would be needed in type approval testing.

As shown in FIG. 3, the terms LLC, RLC and MAC refer to layers (protocol layer) of the protocol structure in the communication protocol used in the mobile station MS. The communication protocol and the different layers constitute the protocol means required in the mobile station for processing and generating data received or to be transmitted. The functions of the known RLC/MAC (Radio Link Control/Medium Access Control) layer 301 are needed between the LLC layer (Logical Link Control) 302 and the physical layer 303 of the wireless communication device MS. The LLC layer 302 is subordinate to the known GPRS mobility management functions (GMM/SM) 305, SNDCP (Subnetwork Dependent Convergency Protocol) functions 304 and also short message service functions. The layers are disclosed in more detail in the GSM standard specifications. The MAC is used for allocating radio channels between wireless communication devices as well as for allocating the physical radio channel to a wireless communication device for receiving and transmission according to the need, as well as for the allocation of LLC frames into the physical GSM radio channel. The RLC block takes care of e.g. requesting for resource allocation for packets to be transmitted to the mobile communication network and to be retransmitted over the radio channel. The SNDCP acts as an interface for the PDP (Packet Data Protocol). The SNDCP block compresses the NPDU (Network Protocol Data Units) received and segments them into one or several LLC frames whose length may vary. These LLC frames are segmented further into RLC data blocks. The GMM protocol supports the functions of mobility management of the mobile station, such as logging in and out (GPRS attach, GPRS detach) and activation (PDP Context Activation, PDP Context Deactivation). The lowermost level, i.e. the physical layer 303 takes care of the physical modulation of radio waves and data transmission between the mobile station and the network.

From the point of view of a mobile station manufacturer, the presence of all the layers of the protocol structure is not always preferred solely to make it possible to test the physical layer. Moreover, the DTE should be connected with the mobile station during the testing. Such arrangements are not possible during tests carried out at the state of manufacturing (production testing). Another problem is, as already mentioned above, the involvement of the upper protocol layers in the testing, wherein the testing and results of the physical layer or the RLC/MAC layer are also affected by the function of an upper layer.

In conclusion, it should be stated that present methods for type approval do not provide means for extensive testing of the physical layer and the RLC/MAC layer of the GPRS system, and particularly not for testing of an uplink connection independently.

SUMMARY OF THE INVENTION

It is an aim of the present invention to present such a method for testing the function of a mobile station that the testing is related to the function of the mobile station in an intended manner. It is also an aim of the invention to present a mobile station whose function can be tested in the above-described way.

A central principle in the invention is to provide the mobile station with a test mode which can be activated by means of a received message. The test mode is used to control the transmission of data generated in the mobile station, particularly uplink data transmission. By means of the message and the test mode, it is possible to determine and control delays, data to be transmitted, and desired functions.

Thanks to the invention, the testing of the function of the mobile station and the channels can be directed to particularly those components of the mobile station whose functioning is to be confirmed e.g. in connection with type approval of the mobile station. Furthermore, the testing apparatuses can be constructed to be simpler than before, and difficulties caused by the function of a data terminal are avoided in the tests. Moreover, the invention has the advantage that the connection between the testing apparatus and the mobile station to be tested is a typical situation for the functioning of the system. As an additional advantage of the invention, it can be mentioned that testing methods used by different manufacturers will be unified, which improves the reliability of the testing.

The testing method of the invention makes it possible to have independent tests for the physical layer of the mobile station uplink and downlink separately. A particular advantage is that for uplink data transmission, the generation of resource requests can be controlled and activated from the testing apparatus, which is needed particularly for setting up different tests related to type approval. The invention has also the advantage that it makes it possible to control the timing of the RLC/MAC layer in testing, which is also needed for setting up different tests related to type approval.

By means of the invention, the use of the uppermost protocol layers and applications is avoided in testing, wherein the tests can be applied already at the early stages of manufacture of mobile stations to test the functions of the RLC/MAC functions and the physical layer.

BRIEF DESCRIPTION OF THE DRAWINGS

In the following, the invention will be described in more detail with reference to the preferred embodiments presented as examples and to the appended drawings, in which.

DETAILED DESCRIPTION OF THE INVENTION

Figure 1:
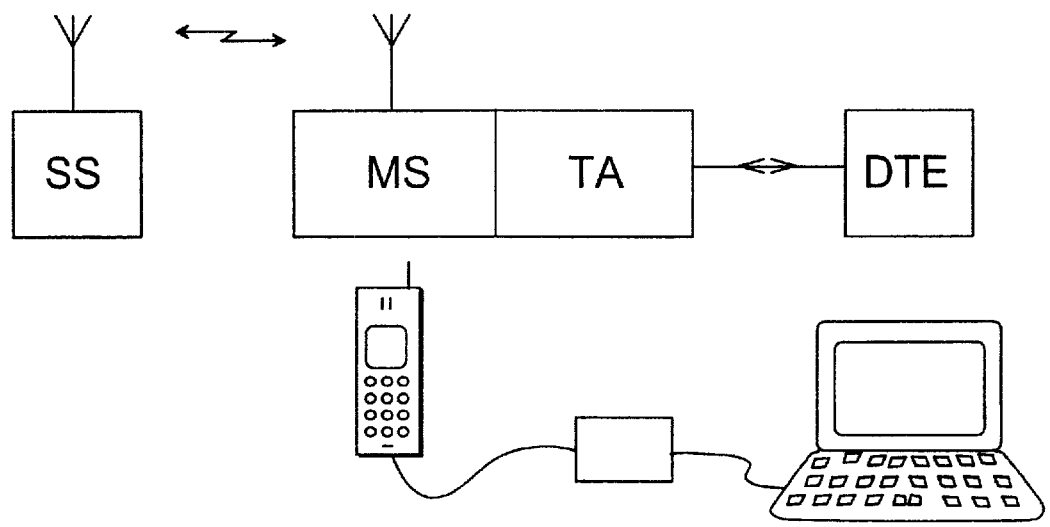
FIG. 1 illustrates testing according to prior art.

In connection with the above description of prior art, reference is made to FIG. 1. In the figures, parts corresponding to each other are indicated with the same reference numerals.

Figure 2:
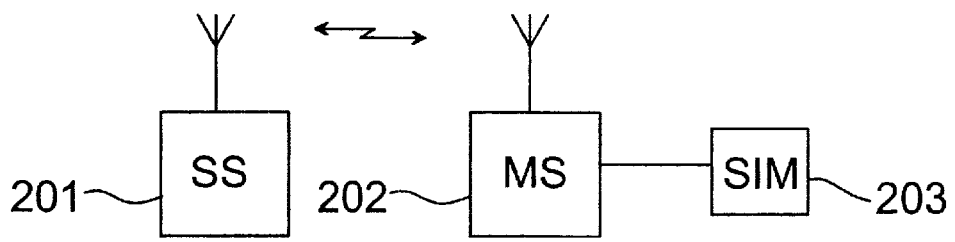
FIG. 2 illustrates the principle of testing according to the invention.

FIG. 2 shows an arrangement, in which a testing apparatus 201 is coupled to a mobile station 202 in a way known as such. For the purposes to be described hereinbelow, it is advantageous that the mobile station 202 is equipped with a SIM (Subscriber Identity Module) 203 which is designed particularly for testing purposes and which can be an smart card similar to the SIM card generally used in mobile stations or a particular SIM simulator for setting up the necessary connections between the SIM connection in the mobile station and a particular apparatus for simulating the function of the SIM. It should be noted that the combination of the SIM simulator and the equipment simulating the function of the SIM cannot be paralleled with connecting an external data terminal device to the mobile station to be tested. The forementioned combination is a part of the testing apparatus, determined precisely in the specification of each cellular radio system, and its use involves none of the problems presented in the description of the prior art for connecting an external data terminal device to a mobile station for the purpose of testing traffic channels.

In modern public land mobile networks (PLMN) based on a cellular network, the system consists in a known way of several mobile stations (MS) using the system, such as mobile phones, and a fixed base station subsystem (BSS). This base station subsystem comprises usually several base transceiver stations (BTS) distributed on a geographical area, each base transceiver station serving a cell covering at least part of this geographical area.

The basic idea of the GPRS system is to use packed switched resource allocation, wherein resources, e.g. a logical radio channel for data transmission, are allocated when there is a need to transmit and receive data and information. Thus, the use of the network and the resources available are optimized and used as efficiently as possible, e.g. in comparison with circuit-switched GSM technology. In the GPRS system, channel allocation is flexible; for example, 1 to 8 logical channels can be allocated on the channel for each wireless communication device. The same resources can be allocated for several active wireless communication devices, and both uplink (i.e. data transmission from the base station to the mobile station) and downlink (i.e. data transmission from the mobile station to the base station) communication can be allocated separately for the users. The channels are used primarily as control channels and traffic channels. Traffic channels are used for the transmission of speech and data, and control channels are used for signalling between the base transceiver station BTS and wireless communication devices MS.

The most significant differences between the GSM and GPRS systems lie in packet-based communication, wherein the radio channels are not reserved for one wireless communication device. In the GPRS system based on the cellular system, the resources are the radio channels used for data transmission (PDCH, Packet Data Channel). Signalling used for general controlling takes place on a PCCCH control channel (Packet Common Control Channel) reserved for that purpose.

More precisely, the physical PDCH channels are divided into logical radio channels by means of a multiframe structure comprising continually transmitted 52 TDMA (Time Division Multiple Access) frames which are further divided into 12 blocks (Radio Block), each divided into 4 frames, and 4 idle frames. In downlink communication, these are used for data transmission and signalling, in uplink communication for data and signalling. In uplink communication, the USF value is used to refer to these time slots, when e.g. a mobile station can transmit information. The blocks are further divided into at least the following elements. MAC header (Medium Access Control Header) comprising a USF field (Uplink State Flag), and the RLC data block (Radio Link Control Data Block) or RLC/MAC control block and. BSC block (Block Check Sequence).

In the GPRS system, all wireless communication devices which are waiting for data to be transmitted on a channel jointly allocated for them, also receive all the blocks of the frame structure, including the RLC block, interpret the received information and thereby the TFI identifier (Temporary Flow Identifier), and first after this, they filter out the blocks with an incorrect TFI. For the function of the whole GPRS system, it is absolutely important that the data of the control blocks in downlink communication is received as error-free as possible.

The basic idea of multiple access in the GPRS network is that the mobile station is capable of receiving all the information transmitted by the serving base transceiver station. From the received RLC blocks, the mobile station finds out the data addressed to it.

Next, we shall discuss testing of downlink communication according to the invention. First, an arrangement according to FIG. 2 is set up, whereby the mobile station 202 to be tested is connected to a testing apparatus 201 and to a testing SIM 203 in a way known as such. Next, the mobile station MS is turned on.

Following this, the mobile station MS performs the login. For using services in the GPRS system, the wireless communication device performs first the login in the network (GPRS attach), whereby the wireless communication device reports that it is ready for packet data transmission. The login forms a logical link, making it possible to inform the wireless communication device of entering packet data. For data transmission and reception, the packet data protocol (PDP) is usually activated, whereby the wireless communication device is given a packet data address to be used in packet data communication, as well as e.g. the protocol (e.g. X.25 or IP) defined for the connection, a connection address (e.g. X.121 address), quality of service, and a network service access point identifier (NSAPI). The mobile station can activate a packet data connection by an activation request message (Activate PDP Context Request).

Figure 4:
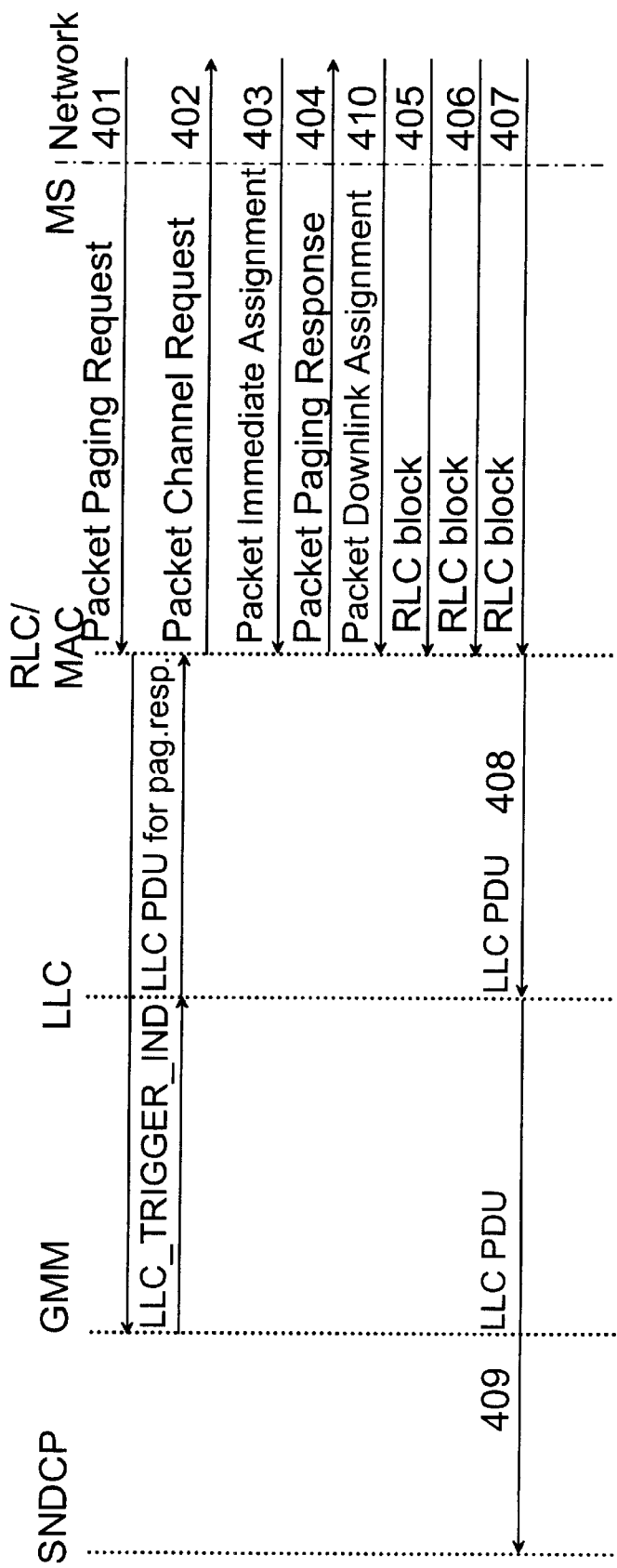
FIG. 4 illustrates the method of the invention upon testing of downlink data transmission.

In downlink testing according to the invention, however, the packet data connection is not activated, wherein all the LLC PDU's received by the SNDCP layer are rejected. After this, normal downlink communication is set up, but when LLC PDU's are transmitted to the SNDCP layer, the PDU's are rejected, because the packet data connection is not activated. The operation is presented in more detail in FIG. 4 which illustrates messages transmitted in communication between the protocol layers 301–306 of a mobile station MS and the communication network, in this case a testing apparatus 201.

After login, for transmitting a downlink data packet (PDU), a paging request 401 is transmitted to the mobile station MS which responds by a packet channel request 402 and asks for resources e.g. on a PRACH channel (Packet Random Access Channel). The network, in this case the testing apparatus, transmits a PIA message (Packet Immediate Assignment) 403 indicating the resources allocated for the mobile station for uplink communication, such as a list of the PDCH channels available and the value of the USF field to be used. The USF value points to the next block in uplink communication, and the USF value is transmitted continuously in connection with downlink communication. The MS transmits a response to the paging request (Packet Paging Response) 404 (by sending an LLC_TRIGGER_IND message, wherein the LLC generates the desired LLC_PDU). The mobile station is still transmitted a PDA message 410 (Packet Downlink Assignment) to indicate the resources available. After this, RLC data blocks 405–407 are transmitted to the mobile station for the transmission of bit information. In the above-described manner, it is possible to test functions of the RLC and MAC layers, wherein also the use of an LLC check sum is possible. The purpose of the RLC layer is to take care of the segmentation of LLC PDU's into RLC data blocks and the recombination of RLC data blocks into LLC PDU's 408. The LLC PDU's are transmitted via different levels to the SNDCP layer 409. The testing apparatus can receive information on the data received by the mobile station depending on the kind of ACK/UNACK mode used in the RLC layer. This mode can be set upon allocation of resources to the mobile station MS.

This testing procedure, which can be used to test the function of the physical layer and the RLC/MAC layer according to the normal function, has the particular advantage of simplicity, wherein the test requires no special arrangements in view of messages. In connection with the test, it should be checked (e.g. by setting a UI parameter) that upon login the mobile station MS shifts from the GPRS idle mode and performs login according to the data in the PSI message (Packet System Information) which is transmitted in the GPRS system on a control channel, such as the PBCCH channel.

In the following, we shall discuss testing of downlink communication according to the invention. The first step is to set up an arrangement according to FIG. 2, in which the mobile station 202 to be tested is coupled to a testing apparatus and a testing SIM 203 in a way known as such. The mobile station 202 is turned on, and the mobile station performs login. At this stage, the mobile station MS shifts from the GPRS idle mode to the GPRS ready state, which must also be checked in the manner presented above. In the idle mode, the mobile station is e.g. not in connection with the MM functions of the GPRS system.

Figure 5:
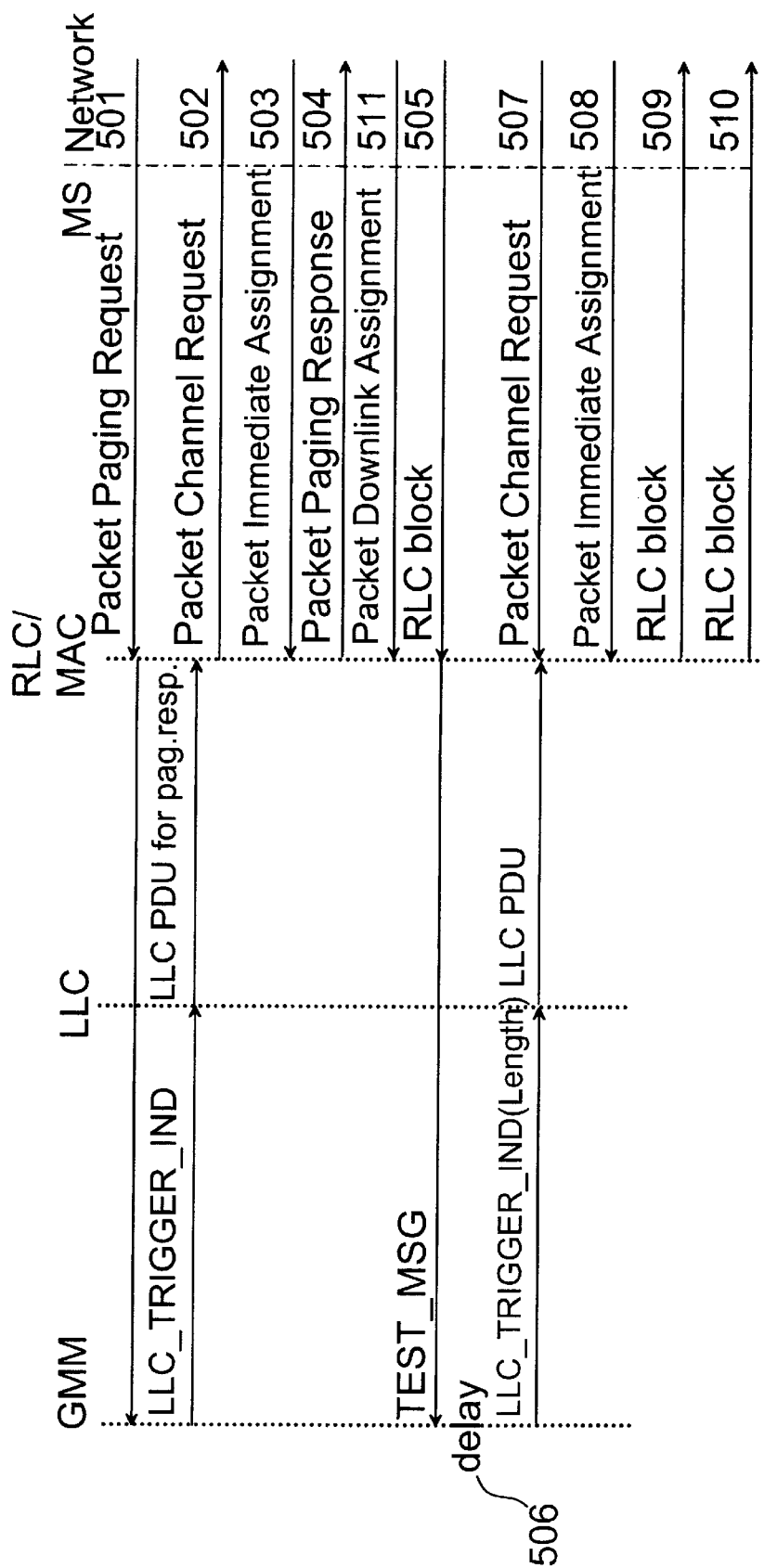
FIG. 5 illustrates the method of the invention upon testing of uplink data transmission.

The testing function is presented in more detail in FIG. 5 which shows the messages passed in communication between the protocol layers 301–305 of the mobile station MS and the communication network, in his case the testing apparatus 201. After the attach, for transmitting a downlink data packet (PDU) 505 to the mobile station MS, the packet paging request 501, packet channel request 502, packet immediate assignment 503, and packet paging response 504 are transmitted as described above. Furthermore, a PDA message (packet downlink assignment) 511 is transmitted to the mobile station, to indicate the resources available. The testing apparatus 201 starts downlink data transmission and testing by sending a special test message 505 in the RLC data block. This special test message 505 includes also information on what kind of uplink data transmission should be started by the mobile station MS. This special test message 505 indicates at least the length of the LLC PDU to be transmitted, which means the length of the PDU formed by the mobile station MS.

At the next stage, the operation of the mobile station depends on the instructions given by the testing apparatus for performing the testing. In the presented example, communication is interrupted and the mobile station MS shifts to the GPRS standby state, in which the mobile station is connected to the MM functions of the GPRS system. According to a presented advantageous embodiment of the test, the GMM layer of the mobile station processes the special test message, and after a determined delay 506 which in this case lasts for the time of two RLC data blocks, the LLC starts the transmission of the PDU (by sending an LLC_TRIGGER_IND message, wherein the LLC forms the desired PDU (LLC_PDU) and transmits it to the RLC layer). The GMM layer is capable of interpreting the special test message, and on the basis of the message, it commands the LLC layer to generate data. Uplink data transmission is started normally by transmitting a packet channel request 507 and a packet immediate assignment 508, after which the transmission of the required RLC data blocks, such as data blocks 509, 510, is started. The above-mentioned generated data can be in random format or bit sequences having e.g. the form "00000 . . . ", "111111 . . . ", "01010101 . . . ", "110011001100 . . . "or "111000111000 . . . ". The special test message may also contain information on the kind of resource request the MS will make. Also, the special test message may contain information on whether test data is to be transmitted continuously or only in a certain quantity, or information on what kind of ACK/UNACK mode is to be used in the RLC layer.

The arrangement is used to test RLC/MAC functions, MAC states, timings and connection set-ups without the influence of an application of an upper layer, particularly the uppermost layer, or data transmitted by the DTE, in which case the testing of timings or the accurate control of the data transmission is not even possible. A particular advantage of the method is the testing of collision situations in data transmission (TBF, Temporary Block Flow) when uplink data transmission is started at the same moment when downlink data transmission is being started, downlink data transfer is going on or downlink data transmission is at end.

Figure 3:
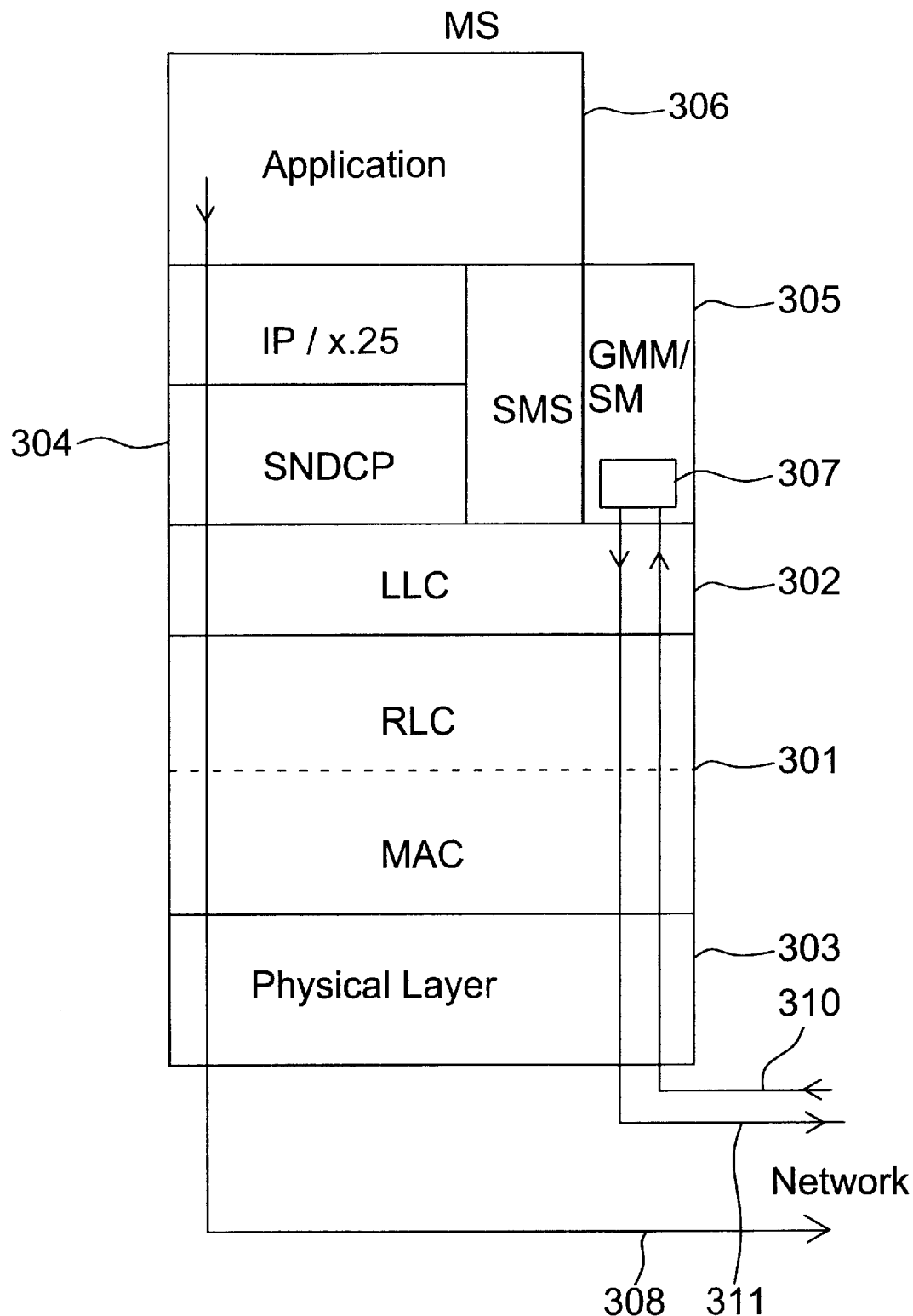
FIG. 3 shows the architecture of the protocol layer of a communication protocol in a mobile station.

When data transmission (the transfer of data blocks) is still going on, it is possible to transmit a new special test message from the testing apparatus on the PACCH channel, which is followed by a delay and the transmission of data blocks in the way described above. In this way, it is possible to continue and control uplink data transmission. By means of the testing procedure, it is possible to provide a desired protocol layer with different test procedures for testing uplink data transmission separately. This is illustrated in FIG. 3 with block 307 showing the test procedure and with uplink data 311. It should be mentioned that the presented block 307 is given for the purpose of illustration only, and it does not limit the test procedure in any way to said layer 305 only or the setting up of the test procedure in different protocol layers. By means of the testing procedure, it is also possible to control directly the desired protocol layer, e.g. the RLC/MAC layer. In the received special test message 310 it is possible to define the parameters to be transmitted to be e.g. information on the length of data to be generated in the mobile station, the delay used, and the test procedure used, wherein it is possible in a simple and precise manner to use the invention to control the testing or the more precise subject of the testing.

When a connection has been set up in the way shown in FIG. 5, the testing apparatus can transmit such various commands to the mobile station which do not require the participation of the upper protocol levels, unaware of the connection, in the traffic. The testing apparatus may generate test data, i.e. test bursts whose information bits contain such desired bit combinations whose error-free reception is the particular subject of investigation. Functionally, the transmission and reception of data take place in the physical protocol layer. In principle, the testing would not need to involve any upper protocol level in the mobile station. However, the physical layer does not make commands involved in the control of the mobile station possible, but some upper layers are involved in the mobile station for their reception and interpretation. Nevertheless, it is normal operation of the mobile station to transmit the information through all the protocol layers up to the application level whose operation the data to be transmitted relate to.

The special test message (TST_MSG) 505 is normally transmitted on the PDTCH traffic channel (Packet Data Traffic CHannel). Testing and the transmission of RLC data blocks can also be started again by transmitting the special test message on the PACCH traffic channel (Packet Associated Control Channel). The GMM layer of the mobile station processes the special test message (TST_MSG), and after a determined delay 506, which in one embodiment of the invention lasts for the time of the transmission of two RLC data blocks, it starts the transmission of the defined LLC PDU. It is also feasible that the special test message is used to set the mobile station in a state in which data transmission takes place in the presented way for a certain time, for example repeatedly. It is also feasible that another special test message is used to reset the mobile station from the test state.

Next, we shall discuss the more detailed structure of the mobile station and the means for receiving and transmitting data. The mobile station comprises an antenna connection, through which downlink data is directed to the mobile station; next, there are radio and intermediate frequency parts, through which the received radio-frequency signal is converted to baseband frequency. The information contained in the baseband signal is reconstructed in a demodulator, after which the processing of the received signal may differ depending on whether it is signalling or data. The information is transferred to a channel decoder and via that to a control block, which is a microprocessor and controls the operation of the mobile station. Information contained in uplink data is generated in the control block, and it is channel coded. In a modulator, the data is added by modulation to baseband oscillation and mixed to radio frequency by means of the radio frequency parts of a transmitter part, after which it can be transmitted via the antenna connection.

Channel coding and decoding can be implemented with one circuit which is programmed to operate in different ways. It is easy for anyone skilled in the art to define the test procedures according to the invention in the above-described manner and to implement the definition in practice, because the mobile station is fully controlled by its control block. The control block, in turn, is a microprocessor which runs a program stored in the memory means available to it and which is used to implement also the protocol means mentioned earlier. When this program is written in such a way that the response to the downlink message of a certain protocol layer received from the testing apparatus is to start the transmission of uplink data to the testing apparatus in a way defined by the protocol means, the mobile station can be made to operate in a desired way according to the invention.

The present invention is not limited solely to the embodiments presented above but it can be modified within the scope of the appended claims. The invention can also be applied e.g. in the UMTS system (Universal Mobile Telecommunication System). The terms and specifications presented in this patent application, referring to a certain system or apparatus, are given as examples and they do not influence the applicability of the invention in all those mobile communication systems in which the mobile station can operate. For example, it is feasible that the different functions are made manually by setting a switch or connector in the mobile station in a desired position. For the fluency and automation of the testing, however, it is preferred that these functions can be made by means of the testing apparatus. It is also obvious that the applicability of the invention is in no way limited solely to mobile stations.

What is claimed is:

1. A method for testing the function of a mobile station, which mobile station is intended to operate in a packet switched communication network based on a cellular network and which mobile station comprises means for receiving downlink data from a testing apparatus, means for transmitting uplink data to the testing apparatus, and protocol means provided in the mobile station for generating and processing data, wherein in response to a downlink message of a certain protocol layer received from the testing apparatus, generating and transmitting uplink data to the testing apparatus is started, wherein the transmission is controlled by a test procedure determined for said protocol layer in the mobile station, the test procedure being activated by means of said message, and wherein said message received from the testing apparatus comprises parameter data on the quantity of the data to be transmitted in response.

2. The method according to claim 1, further comprising the step of setting, in response to said message received from the testing apparatus, the mobile station in a mode in which an acknowledgement of transmission of data between the testing apparatus and the mobile station is not transmitted to protocol layers above a determined protocol layer.

3. The method according to claim 1, further comprising the step of starting data transmission from the mobile station to the testing apparatus first after a predetermined delay from the arrival of said message.

4. The method according to claim 1, further comprising the step of generating said uplink data to be transmitted solely in the mobile station.

5. The method according to claim 1, further comprising the step of timing data transmission from the mobile station to the testing apparatus to start simultaneously with the arrival, simultaneously with the transmission, or simultaneously with the termination of the transmission of other downlink data from the testing apparatus.

6. The method according to claim 1, wherein said message received from the testing apparatus comprises parameter data on the quality of the data to be transmitted in response.

7. The method according to claim 1, wherein, in response to said downlink message of a certain protocol layer received from the testing apparatus, said protocol layer interprets the message and gives orders to a lower protocol layer to transmit uplink data to the testing apparatus.

8. A mobile station which is intended to operate in a packet switched communication network based on a cellular network and which mobile station comprises means for receiving downlink data from a testing apparatus, means for transmitting uplink data to the testing apparatus, and protocol means provided in the mobile station to generate and process data, wherein a test procedure is defined for a certain protocol layer in the mobile station which test procedure can be activated by means of a downlink message of said protocol layer received from the testing apparatus, and which test procedure is used to control the generation and transmission of uplink data to the testing apparatus to be started in response to said message, wherein said message received from the testing apparatus comprises parameter data on the quantity of the data to be transmitted in response.

9. The mobile station according to claim 8, wherein, in response to said message received from the testing apparatus, the mobile station is arranged to be set in a mode in which no acknowledgement on data transmission between the testing apparatus and the mobile station is transmitted to the protocol layers above a determined protocol layer.

10. The mobile station according to claim 8, wherein data transmission from the mobile station to the testing apparatus is arranged to be started first after a predetermined delay from the arrival of said message.

11. The mobile station according to claim 8, wherein said uplink data to be transmitted is arranged to be generated independently solely in the mobile station.

12. The mobile station according to claim 8, wherein, in response to said downlink message of a certain protocol layer received from the testing apparatus, said protocol layer is arranged for the purpose of interpreting said message and giving instructions to a lower protocol layer for the transmission of uplink data to the testing apparatus.

13. The mobile station according to claim 8, wherein it is a mobile station arranged to operate in the GPRS system.

* * * * *